US012681696B2

(12) United States Patent
Mueller et al.

(10) Patent No.: US 12,681,696 B2
(45) Date of Patent: Jul. 14, 2026

(54) FAST MODULAR MULTIPLICATION OF LARGE INTEGERS

(71) Applicant: INTERNATIONAL BUSINESS MACHINES CORPORATION, Armonk, NY (US)

(72) Inventors: Silvia Melitta Mueller, St. Ingbert (DE); Ulrich Mayer, Weil im Schoenbuch (DE); Dominik Steenken, Sindelfingen (DE); Yvo Thomas Bernard Mulder, Reutlingen (DE); Manoj Kumar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 17/811,079

(22) Filed: Jul. 7, 2022

(65) Prior Publication Data

US 2024/0012615 A1 Jan. 11, 2024

(51) Int. Cl.
*G06F 7/72* (2006.01)

(52) U.S. Cl.
CPC .................................. *G06F 7/725* (2013.01)

(58) Field of Classification Search
CPC ................................................ G06F 7/72–729
See application file for complete search history.

(56) References Cited

U.S. PATENT DOCUMENTS

| | | | | |
|---|---|---|---|---|
| 4,722,067 A | * | 1/1988 | Williams | .............. G06F 9/3552 |
| | | | | 712/E9.043 |
| 6,356,636 B1 | | 3/2002 | Foster | |
| 6,662,201 B1 | * | 12/2003 | Kawamura | ............. G06F 7/729 |
| | | | | 708/491 |
| 10,387,122 B1 | * | 8/2019 | Olsen | ..................... G06N 3/063 |
| 2002/0059353 A1 | | 5/2002 | Koc | |
| 2006/0123325 A1 | * | 6/2006 | Wilson | ................... G06F 7/724 |
| | | | | 714/781 |
| 2020/0004506 A1 | * | 1/2020 | Langhammer | ......... G06F 7/724 |

(Continued)

FOREIGN PATENT DOCUMENTS

| | | | |
|---|---|---|---|
| EP | 4552010 A1 | 5/2025 | |
| WO | 2024/008837 A1 | 1/2024 | |

OTHER PUBLICATIONS

Hennessy, John L., et al. Computer Architecture : A Quantitative Approach, Elsevier Science & Technology, 2014. ProQuest Ebook Central, http://ebookcentral.proquest.com/lib/USPTO-ebooks/detail.action?docID=404052. (Year: 2014).*

(Continued)

*Primary Examiner* — Andrew Caldwell
*Assistant Examiner* — Huy Duong
(74) *Attorney, Agent, or Firm* — Edward J. Wixted, III

(57) ABSTRACT

In an approach, a processor receives a plurality of first operand values, where the first operand values are integer values. A processor adds, using binary addition, the plurality of first operand values resulting in a sum value S. A processor determines a single combined modular correction term D for a binary sum of all operand values based on leading bits of the sum value S. A processor performs a modular addition of S and D resulting in a modular sum of said plurality of said first operand values.

8 Claims, 10 Drawing Sheets

(56) References Cited

U.S. PATENT DOCUMENTS

2020/0310761 A1    10/2020   Rossi
2023/0188322 A1*    6/2023   Bajpeyi ................... H04L 9/008

OTHER PUBLICATIONS

Yanik, T. "Incomplete Reduction in Modular Arithmetic." Cetinkayakoc. Net, 2002, cetinkayakoc.net/docs/j56.pdf. (Year: 2002).*

"Notification of Transmittal of the International Search Report and the Written Opinion of the International Searching Authority, or the Declaration", File Reference P202101061PCT01, International application No. PCT/EP2023/068645, International Filing Date Jul. 6, 2023, Mailed on Oct. 19, 2023, 10 pages.

Jenkins, "A Technique for the Efficient Generation of Projections for Error Correcting Residue Codes", https://ieeexplore.ieee.org/document/1085468, IEEE Transactions on Circuits and Systems, vol. 31, Issue:2, Feb. 1984, pp. 223-226.

"Blockchain link polygon dots 3", IBM DAM Library, Printed Jun. 9, 2022, 2 pages.

Bunimov et al., "Area and time efficient modular multiplication of large integers", Proceedings IEEE International Conference on Application-Specific Systems, Architectures, and Processors. ASAP 2003, Virtual Conference, Jul. 12-14, 2022 10 pages, <https://ieeexplore.ieee.org/abstract/document/1212863>.

Daneshbeh, Amir, K.," A Speedup Technique for High Performance Foster-Montgomery Multipliers used in Security Processors", An IP.com Prior Art Database Technical Disclosure, Original Publication Date: Nov. 22, 2002, IP.com No. IPCOM000010391D, 7 pages, <https://priorart.ip.com/IPCOM/000010391>.

Langley et al., "Elliptic Curves for Security", Jan. 2016, IETF.org, 22 pages, <https://datatracker.ietf.org/doc/html/rfc7748>.

Menezes et al., "Handbook of Applied Cryptography", Chapter 14 from Handbook of Applied Cryptography, CRC Press, 1996, 45 pages.

Solinas, Jerome A., "Generalized Mersenne Numbers", Technical Report Corr 99-39, 23 pages.

Sreehari et al., "Fast Modular Reduction for Large-Integer Multiplication", Proceedings of the 2012 Second International Conference on Digital Information and Communication Technology and it's Applications (DICTAP), May 16-18, 2012, Bangkok, Thailand, 4 pages, <https://ieeexplore.ieee.org/abstract/document/6215379>.

Zimmermann, Reto, "Efficient VLSI Implementation of Modulo 2 n 1 Addition and Multiplication", Proceedings of the 14th IEEE Symposium on Computer Arithmetic (ARITH 14), Apr. 14-16, 1999, Adelaide, Australia, 10 pages, <https://citeseerx.ist.psu.edu/viewdoc/download?doi=10.1.1.145.5115&rep=rep1&type=pdf>.

Github. "openssl/openssl", retrieved from web https://web.archive.org/web/20220706035439/https://github.com/openssl/openssl, Jul. 6, 2022, 5 pages.

Response to communication pursuant to Rule 161(1) dated Mar. 27, 2025, Application No. 23741986.6, IBM Patent Reference, 4 pages.

* cited by examiner

Figure 1:
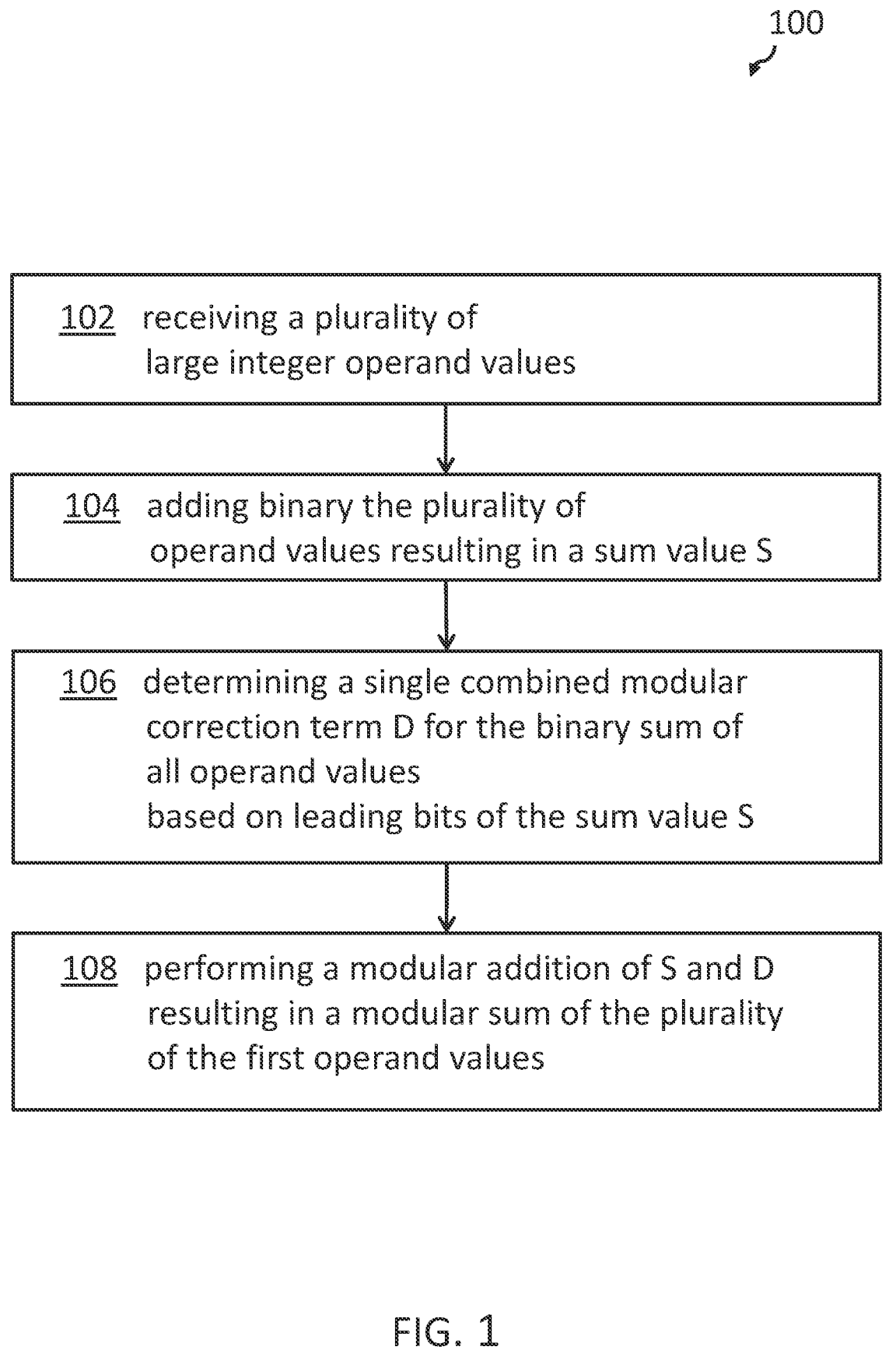

100

102    receiving a plurality of
       large integer operand values 104    adding binary the plurality of
       operand values resulting in a sum value S 106    determining a single combined modular
       correction term D for the binary sum of
       all operand values
       based on leading bits of the sum value S 108    performing a modular addition of S and D
       resulting in a modular sum of the plurality
       of the first operand values

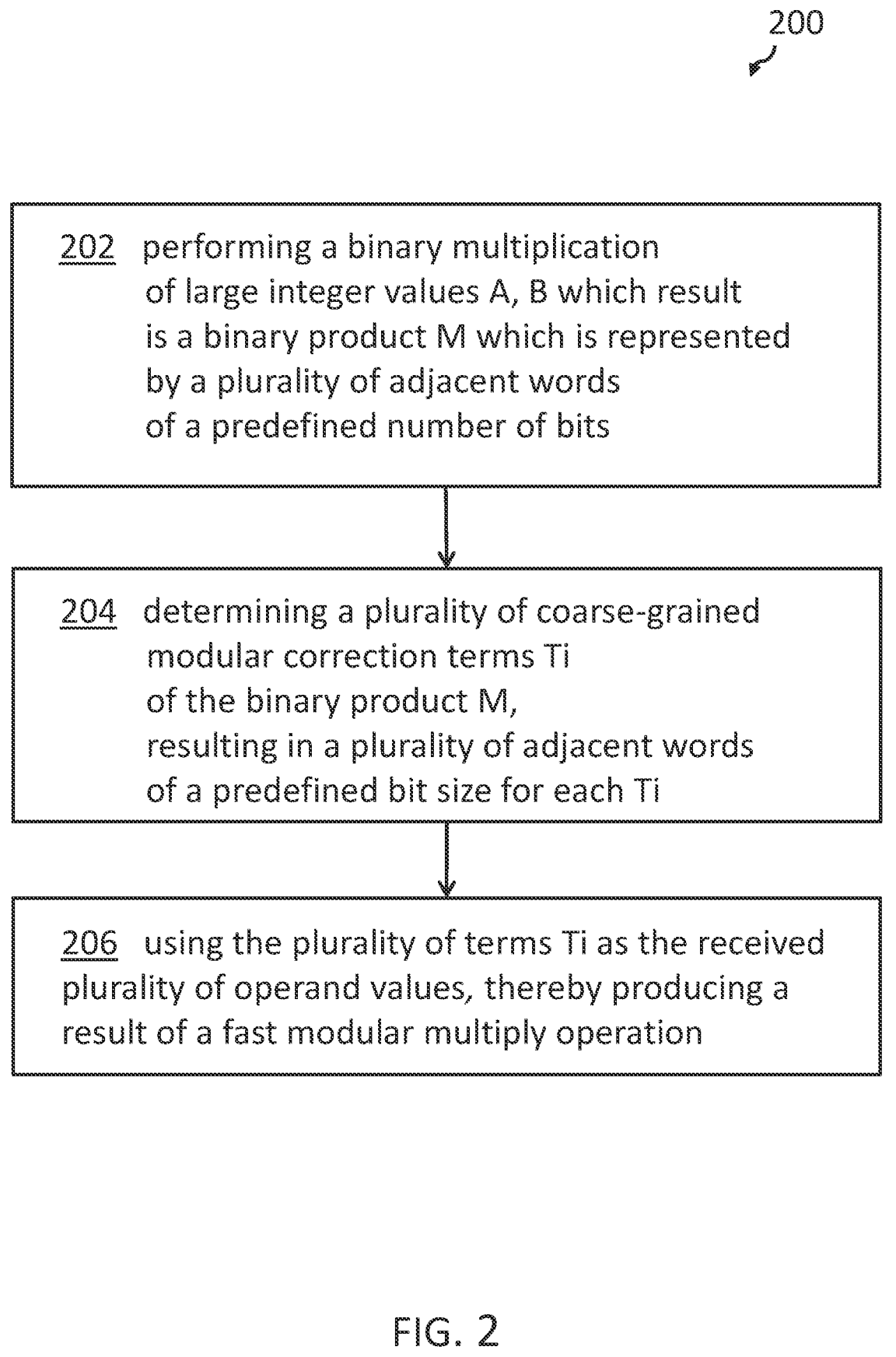

202   performing a binary multiplication
of large integer values A, B which result
is a binary product M which is represented
by a plurality of adjacent words
of a predefined number of bits 204   determining a plurality of coarse-grained
modular correction terms Ti
of the binary product M,
resulting in a plurality of adjacent words
of a predefined bit size for each Ti 206   using the plurality of terms Ti as the received
plurality of operand values, thereby producing a
result of a fast modular multiply operation

FIG. 2

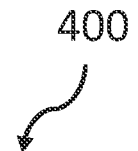
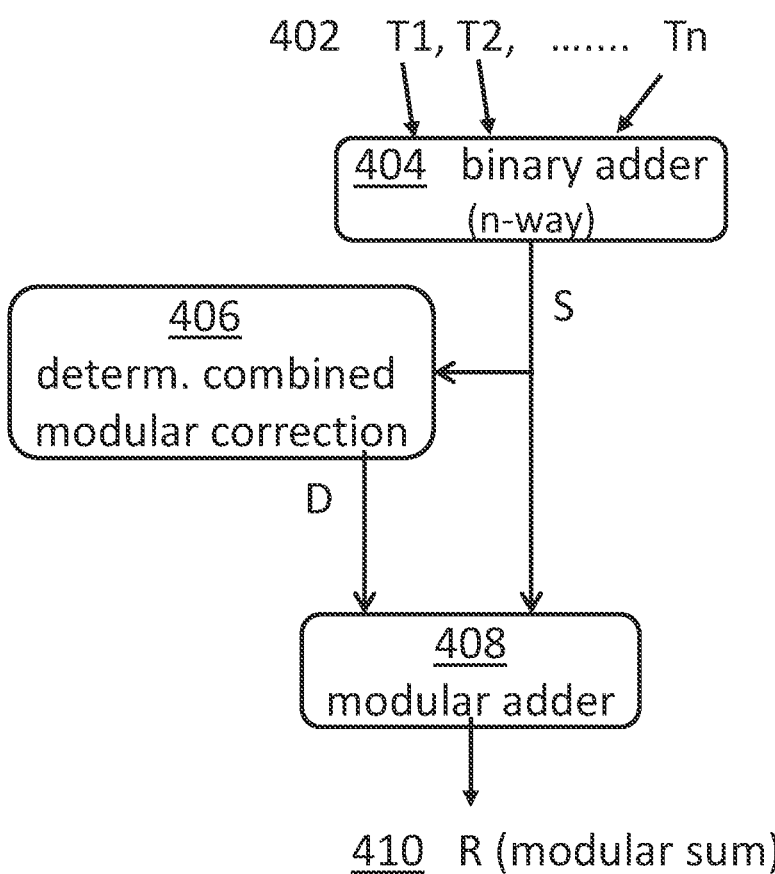
FIG. 4

600

700

404
binary adder
(n-way)

402   T1, T2,  .......   Tn 702   reduction tree (CSA)

406
determ. combined
modular correction

704   S as
carry/sum vector
pair

D 408   modular
adder 706
binary adder 708   select logic

410   R (modular sum)

$W$ = wordsize of processor

P = n-bit number $I = \lceil n/p \rceil$, wherein $\lceil ... \rceil$ is the ceiling operator

1000

1004

1002

1008    1012

1010

1016

1006

1014

400, 500, 600, 700, 800

1022

1018

1020

FAST MODULAR MULTIPLICATION OF LARGE INTEGERS

BACKGROUND

The present invention relates to modular additions of operands, and more specifically, to fast modular addition of a plurality of operands of large integer values.

In modern information technology (IT), improvements in hardware development and software requirements enrich each other. Sometimes there are faster advances in hardware that enable the development of new software concepts, and sometimes the software advances faster driving new hardware capability requirements. One of these advances on the software side is blockchain technology, which enables fully distributed ledger systems without a central point of control. Such technology may be used for workloads for electronic business transactions. One of the fundamental and underlying technologies used is based on cryptography, e.g., on elliptic curve cryptography (ECC) which builds on operations such as point add and point double; operations such as "sign," to add a new transaction or "verify," to have other clients certify the transaction always involve such ECC operation (e.g., the known HyperLedger software spends about 60% in ECC with a ratio of 6:1 for verification vs. signing operations).

However, ECC is not only used in blockchain projects but also outside of that specific domain. Particularly, ECC support has already been integrated into hardware devices.

On a higher level, ECC requires operations such as sign, verify, and scalar multiply. These operations build on functions like pointAdd, wherein each step is a mod-P operation, wherein P is a large prime number. pointAdd involved simpler operations like add, subtract, multiply, and halve using very wide integer values of, e.g., 256 bit to 521 bit and, in some cases, also larger. Typical curves used in this context comprise NIST P256, P384, P521 (NIST: US National Institute of Standards and Technology) as well as Edward curves 448, 255-19. Hence, bit-sizes of 521 bits (in words: five-hundred-twenty-one) are not uncommon, and in some cases, today, up to 8k bit operands are used, which may even be extended in the future.

On the other side, there are hardware processors whose registers for add and multiply operations are typically the size of a memory word (e.g., 32 or 64 bit) with the optional ability to also address double word integers. However, the above-mentioned large bit numbers for operands are typically beyond the capability of standard processors for performing add and multiply operations or even modular add and multiply operations as a single instruction in a fully pipelined manner. Especially, the modular multiplication for those wide numbers is compute intensive and difficult to verify. Thus, the modular multiplication of two wide integer numbers A and B usually gets performed as a binary multiplication producing a binary product M=A*B followed by a modulo (or modulus) operation producing the result R=M mod P. It should be noted that M can be expressed as the sum of R and a multiple of P, i.e., M=R+k*P, where k is an integer. In a naïve implementation, the modular reduction of M could be performed by subtracting multiples of P from M until the difference is between 0 and P. Each of these subtractions can be formally verified, even for integers with a few hundred bits. However, this scheme is far too slow. Therefore, more elaborate algorithms and hardware implementations are used for reducing the binary product with just a few steps. Usually, such algorithms apply coarse-grained and fine-grained corrections to the binary product.

One kind of operation required in such approaches relies on modular add operations on a larger number of terms, e.g., in a sequence, or also as a modular subtraction which can be viewed as a modular add with negative terms. Additionally, these operations are also required for multiplication of the bit-wise wide operands, as mentioned above.

Meyer (US 2021/0243006 A1) (hereinafter Meyer) describes "an integrated circuit for modular multiplication of two integers for a cryptographic method has a processor that represents the integers to be multiplied in Montgomery representation with a specified Montgomery representation parameter and a specified modulus, and calculates the result of the modular multiplication of the integers to be multiplied in Montgomery representation iteratively from the least significant word to the most significant word[.]" (Meyer, Abstract).

Sinardi et al. (WO 2018/019788 A1) (hereinafter Sinardi) also discloses an "implementation of modular multiplication" and "Elliptic Curve digital Signature Algorithm (ECDSA) . . . verification and signature processes using the Montgomery multiplication, which avoids the costly pre-calculation of the Montgomery constant $R^2$, by making use of the Montgomery multiplication properties and little Fermat theorem." (Sinardi, Abstract).

However, there remains a need for even faster hardware implementations for large integer add and multiply operations, reduced cycle times, as well as for other Elliptic curves.

SUMMARY

According to one aspect of the present invention, a computer-implemented method may be provided. The method may comprise receiving a plurality of first operand values, wherein the first operand values are integer values, adding, using binary addition, the plurality of first operand values resulting in a sum value S, and determining a single combined modular correction term D for a binary sum of all operand values based on leading bits of the sum value S. Furthermore, the method may comprise performing a modular addition of S and D resulting in a modular sum of the plurality of the first operand values.

According to another aspect of the present invention, a system may be provided. The system may comprise a receiving unit for a plurality of first operand values, wherein the operand values are integer values and a binary adder unit adapted for adding, using binary addition, the plurality of first operand values resulting in a sum value S. Additionally, the fast modular addition system may also comprise a determination unit adapted for determining a single combined modular correction term D for a binary sum of all operand values based on the sum value S, and a modular adder unit adapted for a modular addition of S and D resulting in a modular sum of the plurality of the first operand values.

The proposed computer-implemented method for a modular addition of a plurality of operands of first large integer values may offer multiple advantages, technical effects, contributions and/or improvements:

A very fast modular adder may be implemented using a number of known components in a new and inventive form. The known components comprise a binary adder unit and multiplexers selection units. The novel units—proposed in this document as different alternatives—make use of the also proposed methods. In particular, a modular multiplier may be based on the novel concept of the modular adder in an advantageous way.

One concept of the proposed approach may be using a binary adder instead of the modular adder. Hence, when adding n operands, instead of performing n binary additions, each followed by a modular reduction, the solution proposes to do n binary additions followed by a single modular reduction, which can increase the speed of binary execution significantly. It may be possible because several binary additions can be executed in parallel if the hardware used allows it. However, a plurality of modular additions can be avoided altogether.

The proposed concept may increase execution speed of modular operation—e.g. add and multiply—significantly when compared to existing technologies. In one implementation a 4 cycle process can be achieved for a modular adder in hardware using a multiplexer, a binary adder, a selector unit and some latches. Further, if using a "carry save adder" unit, some input latch, a binary adder, a selector and an output latch, only 3 machine cycles may be sufficient to perform a multi-input modular add operation for wide-sized integer values.

The proposed concept may also overcome the drawback of a modular multiply operation in a Montgomery domain which is also known as a fast approach to a modular multiply operation. However, switching to the Montgomery domain and back is known to be slow. Especially, for Mersenne primes reduction operation are much faster. Currently, a cross-over point compared to a pure binary design is considered to be beyond 512 bits. However, for consistency reasons, the proposed technique may also be for integer values with fewer bits, e.g. starting from 256 bits (or even lower).

Furthermore, due to performing the reduction in binary arithmetic, the plurality of Ti (note: Ti may be a collection of intermediate product terms organized as a large integer. Multiple T's, for different i in Ti must be added; compare below) may also be scaled by a power of two without adding extra terms. Whereas, when performing the reduction with modular add, a 2*Ti has either to be treated as to terms Ti+Ti or a modular-double operation has to be performed. Thus, the binary scheme with scaled Ti may require fewer terms in the reduction. E.g., for P256 only 9 instead of 11 terms may be required. For P384, only 10 terms instead of 11 terms may be required. Thereby, the latency for P256 can be as small as 6 machine cycles: (i) one machine cycle for building the Ti and sending them to the reduction tree, which may be shared with a multiplier; (ii) one machine cycle for the reduction of the nine terms to two terms in the form of a sum/carry vector; (iii) one machine cycle for a determination of D based on the sum/carry vector approach and; (iv) three machine cycles for the modular add.

Compared to conventional modular operation designs with typically 30 cycles, the proposed solution may be five times faster. Furthermore, the hardware overhead may be small, since the reduction tree of the multiplier may be reused. When the reduction of the 11 terms is done in the 2-cycle adder instead, the binary additions can be interleaved and done in 10 cycles (instead of two). With 4-6 cycles for the steps (iii) and (iv), one gets 14 or 16 cycles, still a 1.75-2.1 speed up if compared to the original 30 machine cycles.

Hence, one can conclude that embodiments of the concepts proposed herein may be significantly faster when implemented in hardware as compared to traditional approaches. Furthermore, a plurality of different implementation designs is possible, (i) for a modular add concept as well as (ii) for a modular multiply concept. This may apply in particular to integers with a large bit size, as mentioned.

Something else can be added here, which can be advantageous in some application areas. Normally, in case one has only one operation to be executed, no special number representation may be required. Typically, a binary operation is exact and would not need correction terms as often discussed in this document. However, modular addition may require the result to be less than the modulus value. A binary addition violates that constraint, thus, the correction term described may need to be added. One could theoretically stop after the binary adder, but then the data value width would grow after each operation, and in ECC one may easily have several hundred to thousands of such operations. Therefore, it may be desirable to keep the data width under control. Bringing it back into the range [0, P) is one thing, the other thing is bringing it into a range, where one—imprecisely spoken—would need a few extra bits, e.g., 1 to 3, to be precise enough.

The proposed concept may also work seamlessly for negative Ti numbers: In this case, one's complement followed by an add operation is used, rather than two's complement followed by the add operation. The number of negative numbers being added in a sequence of input arguments can be seen as an algorithm constant; so, the discrepancy introduced by using one's complement can be corrected in a single step.

In the following, additional embodiments of the inventive concept—applicable for the method as well as for the system—will be described.

According to a preferred embodiment of the method, the sum value S is represented in a redundant number form. When multiple large integer valued operands, properly formatted in a redundant number format are added, the need to propagate a carry across the words of the sum S is averted. This may further help to improve operational efficiency. In a related embodiment, the redundant number form may be a reduced-radix form. This may make calculations even more efficient.

According to another preferred embodiment, the method may also comprise determining a correction value $-k*P$, where k is a value representing the leading bits of the sum value S. This may support the efficient concept that the operation R=M mod P can be transformed to $M=R+k*P$, where k is an integer and P is a prime number.

According to an embodiment of the method, the correction value may be determined using a lookup table. A lookup table may increase the determination speed even more because normally less CPU cycles are required than for a real calculation. In the given case, the lookup table may give the modulus of the number represented by the high-order bits D.

According to an embodiment, the method may also comprise performing a binary multiplication—e.g., R=A*B—of second integer values A and B, which results in a binary product M, which is represented by a plurality of adjacent words of a predefined number of bits. The integer value A and B may also here be in the range of 256 to 521 bits, but are not limited to that.

This or a related embodiment may also comprise determining a plurality of coarse-grained modular correction terms Ti of the binary product M, resulting in a plurality of adjacent words of a predefined bit size for each Ti. The predefined bit size may be the same as the start value of the operation, but may usually be of lower size. This may be even as small as the word size of the CPU or memory words. This may then produce a result of a fast modular multiply operation, which may be a motivation for this embodiment. It may also be mentioned that there are some C++ libraries supporting the R=A*B operation based on the theory of Solinas. Existing concepts may thus be used advantageously for the inventive concept or be combined with it.

According to another embodiment of the method, the second integer values are represented in a redundant number form. And, in an even further embodiment the redundant number form may be a reduced-radix form. Here, the same advantages as for the first large integer values may apply.

According to an embodiment, the method may also comprise responsive to receiving the second integer values in a non-redundant format, transforming the received second integer values into a redundant number form. This format does not have to be the same as the one mentioned above and may also be another redundant format or representation.

According to an embodiment of the method, the plurality of first operand values may originate from a Solinas reduction operation or from a Barrett reduction operation. These reduction techniques have been proven to be specifically useful in the concept of embodiments of the novel approach.

According to an embodiment of the method, the operand A and B may each be an integer value having a number of bits between 255 to 521, or up to $2^13$. This may also include prime 521 used for the Edward curve implementation. The number of bits per integer may also be even higher. A smaller number of bits per operand would technically be possible, but from a performance improvement point it may technically not make any sense.

According to another embodiment of the method, wherein the received integer values are operand values for elliptic curve operations. In Elliptic Curve Cryptography (ECC), the point operations, i.e., an addition of two points on the curve, or scalar multiplication, are ultimately reduced to modular addition and modular multiplication of large integers.

Subsequently, additional embodiments of the fast modular addition system shall be described:

According to one embodiment of the fast modular addition system, the determination unit may be adapted for determining the single combined modular correction term D for the binary sum of all operand values based on leading bits the sum value S. Thus, instead of performing an expensive modular addition for each received large integer value (except one, n−1 additions are required to add n values), one performs less expensive binary additions and one final modular operation to bring the sum produced by the binary additions within the range of the modulus.

According to one embodiment of the fast modular addition system, the binary adder unit may comprise a reduction tree generator module—e.g., in form of a carry sum adder—which may be adapted for receiving the plurality of integer values from the receiving unit, and an internal binary adder unit adapted for receiving output values of the reduction tree generator module. This option will be discussed in a more detailed form in the context of FIG. 6.

According to a further embodiment of the fast modular addition system, the modular adder may comprise a binary adder adapted for adding, using binary addition, the sum value S and D and a select logic adapted for determining the modular sum of the plurality of the first operand values. This option will be discussed in more detail in the context of FIG. 7.

According to again another interesting embodiment of the fast modular addition system, the binary adder unit may be a reduction tree generator module adapted for receiving the plurality of large integer values from the receiving unit, and which may be adapted for generating an output as a sum/carry vector pair (compare FIG. 7, 704), wherein the binary sum comprises an identical bit-width as the received large integer values, and wherein the carry comprises a predefined number carry bits. Obviously, this embodiment would use a redundant number format or representation. It can also be seen as a more complete diagram in FIG. 7.

According to another advanced embodiment of the fast modular addition system, the modular adder may comprise a binary adder for binary adding the sum/carry vector pair and the value D, wherein the value D is determined based on the sum/carry vector pair (compare reference numeral 406 in FIG. 7) and a select logic (compare reference numeral 708 in FIG. 7) adapted for determining the modular sum of the plurality of the first operand values. This embodiment may also be denoted as variant 1.

According to an additionally useful embodiment the fast modular addition system may also comprise a receiving unit for two second operand values (A, B), wherein the operand values are integer values, a binary multiplier (compare reference numeral 502 of FIG. 5) adapted for receiving the second two operand values from the receiving unit, a correction unit (compare reference numeral 504 of FIG. 5) adapted for a determination of correction terms of the binary multiplier resulting in the plurality of first large integer values (T1, . . . Tn). This may implement a modular multiplier based on the initially proposed modular adder. Details can be understood in connection with FIG. 5.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings:

FIG. 1 shows a block diagram of an embodiment of an approach for a modular addition of a plurality of operands of large integer values, in accordance with an embodiment of the present invention.

FIG. 2 shows a block diagram of an approach for a modular multiplication of at least two operands of large integer values, in accordance with an embodiment of the present invention.

Figure 3:
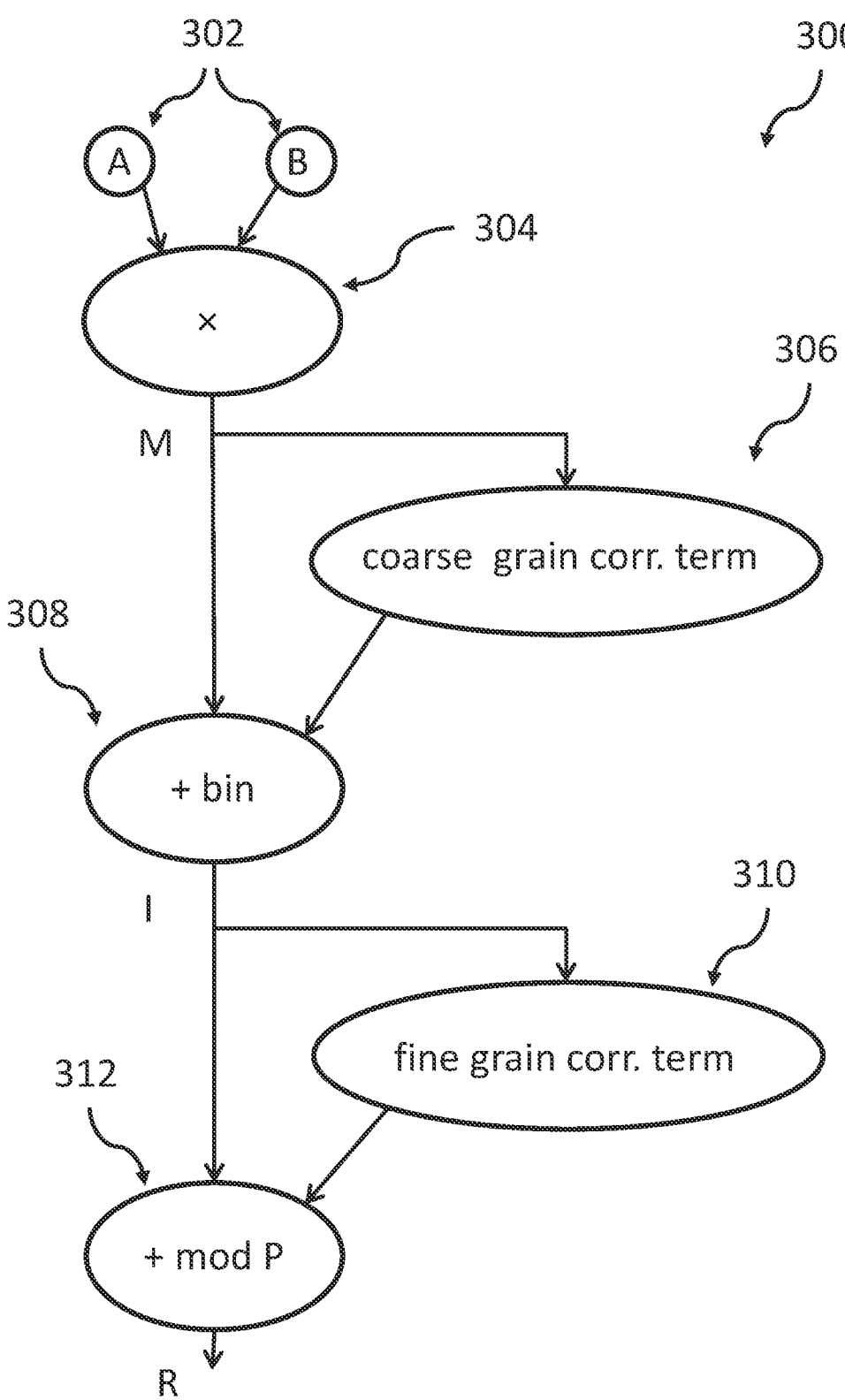

FIG. 3 shows a block diagram of a modular multiplication with correction terms, in accordance with an embodiment of the present invention.

FIG. 4 shows a block diagram of a modular adder for a plurality of terms Tn, in accordance with an embodiment of the present invention.

Figure 5:
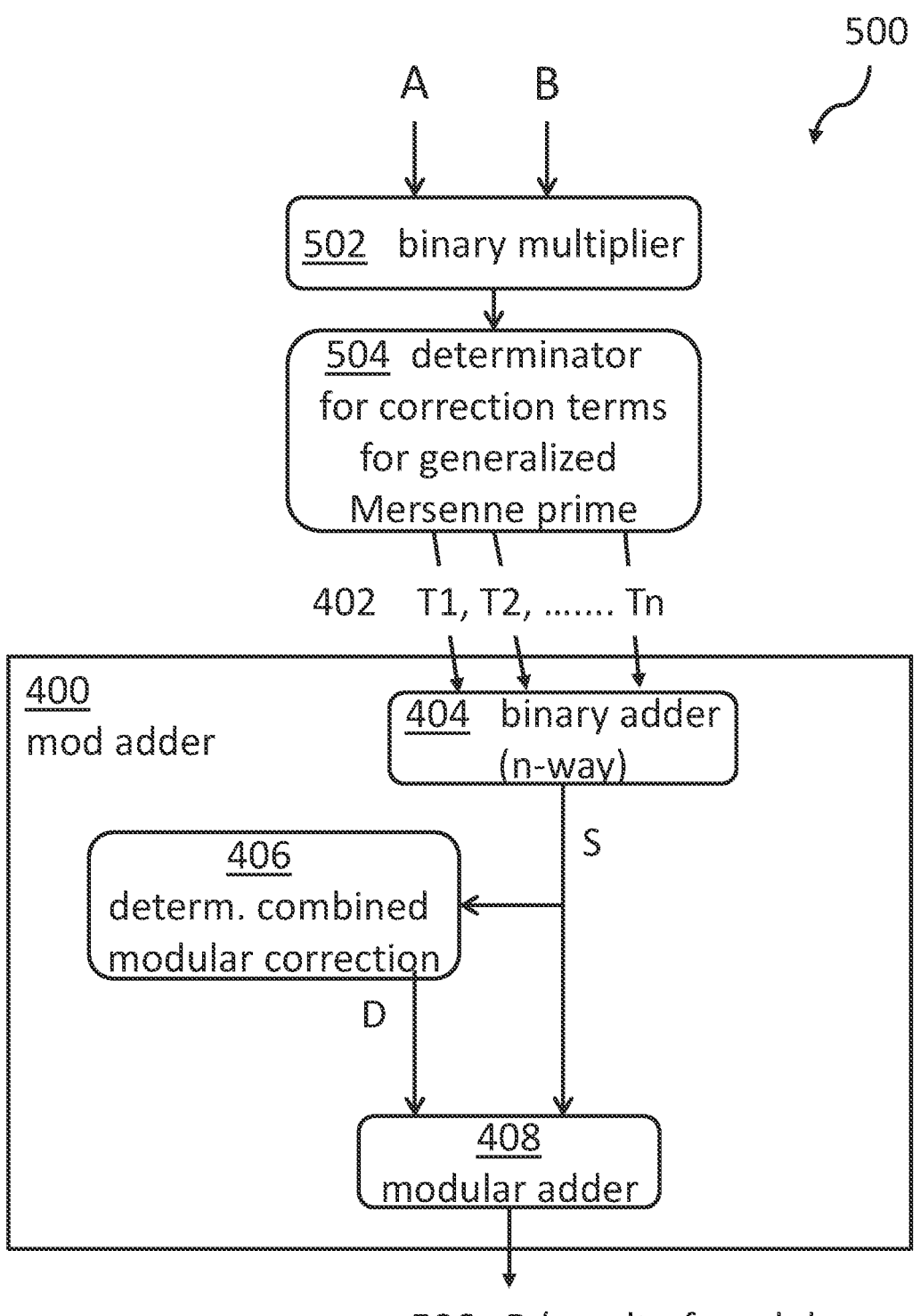

FIG. 5 shows a block diagram of a modular multiplier for generalized Mersenne primes, in accordance with an embodiment of the present invention.

Figure 6:
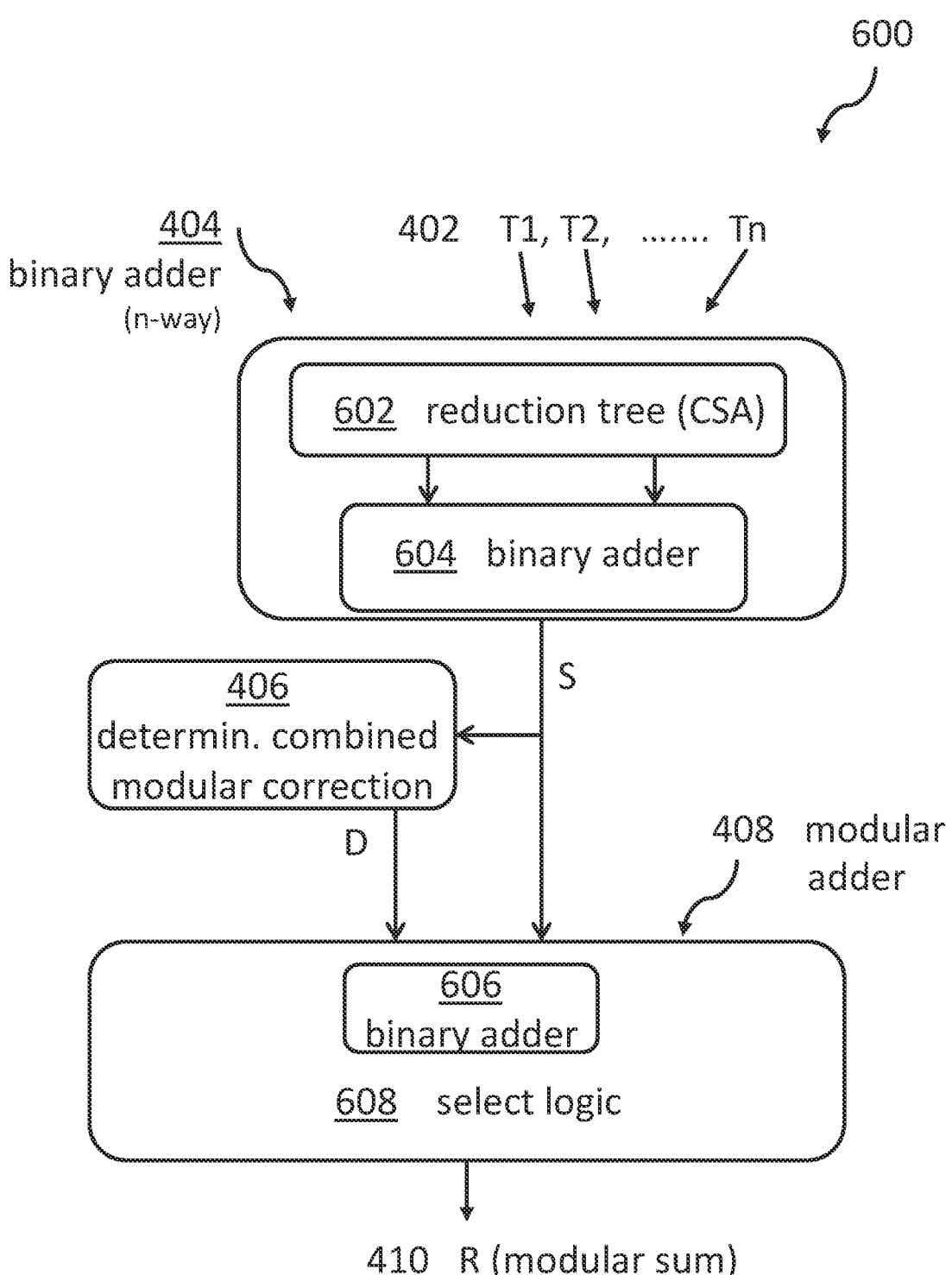
Figure 7:
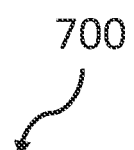

FIG. 6 shows a block diagram of a modified modular adder for a plurality of terms Tn according to FIG. 4, in accordance with an embodiment of the present invention FIG. 7 shows a variant of a modular adder using a reduction tree in the form of a carry sum adder, in accordance with an embodiment of the present invention.

Figure 8:
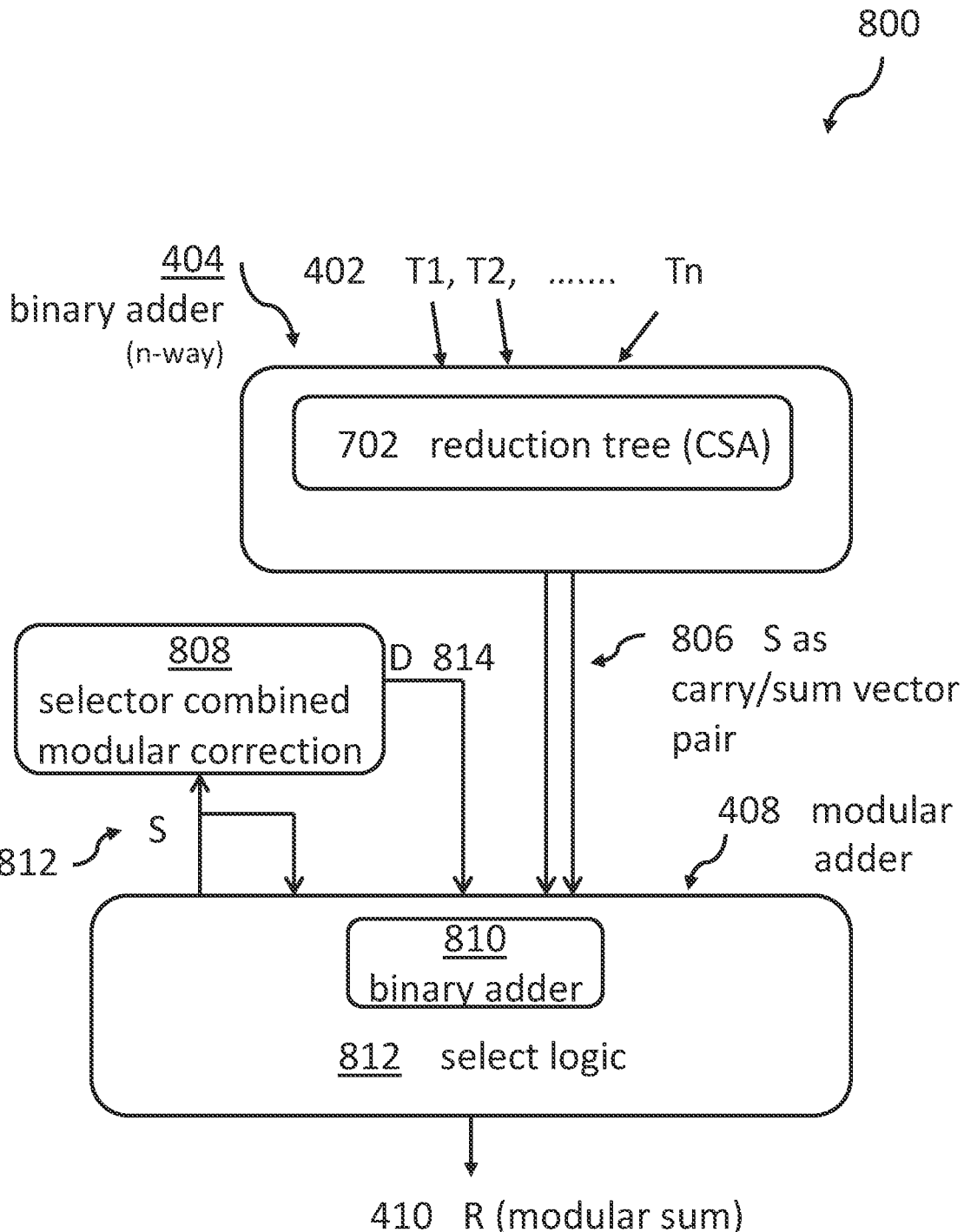

FIG. 8 shows a variant of modular adder with a different handling of the carry/sum vector pair, in accordance with an embodiment of the present invention.

Figure 9:
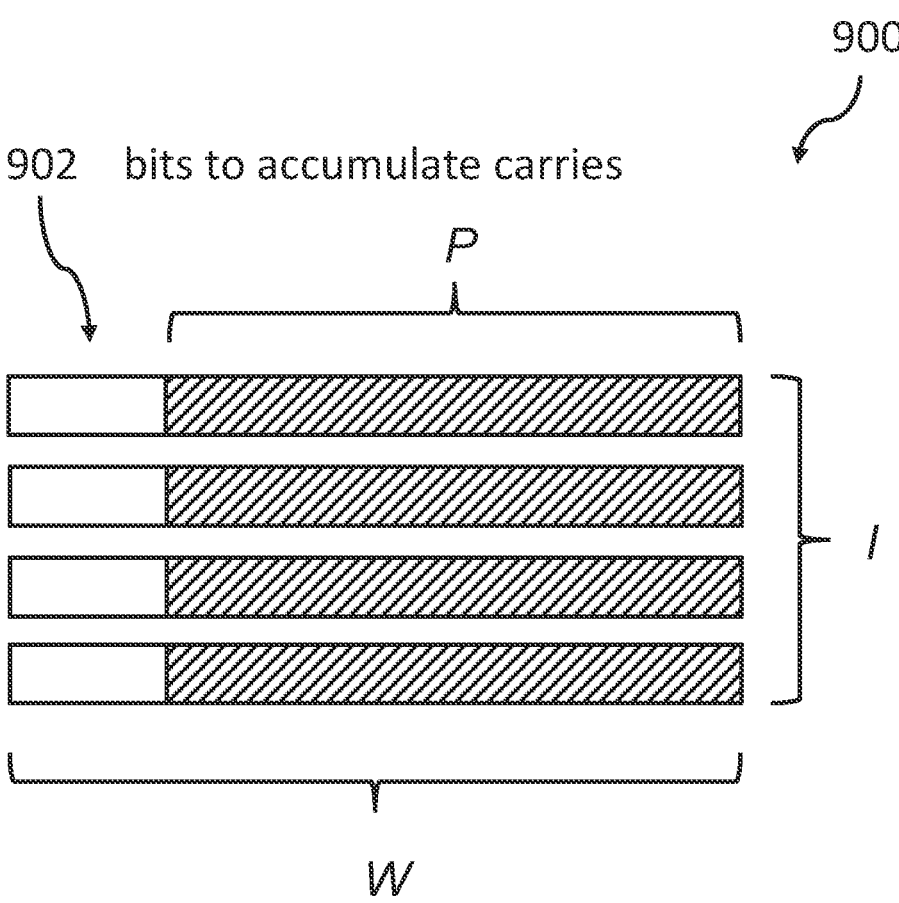

FIG. 9 shows a data structure, in accordance with an embodiment of the present invention.

Figure 10:
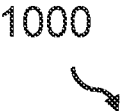

FIG. 10 shows a block diagram of a computing system comprising a system according to any of the FIGS. 4 to 8, in accordance with an embodiment of the present invention.

DETAILED DESCRIPTION

In the context of this description, the following technical conventions, terms and/or expressions may be used:

The term 'modular addition' may denote a mathematical operation in modular arithmetic, expressed as result=(a+b) mod c. Sometimes, a "%"-sign is used to symbolize the modulus operator, e.g., the modular add R=(A+B) mod P—using the assumption: $0 \leq A$, B<P and P is a prime number—is easy to solve because the binary sum is $0 \leq A+B<2*P$. A hardware implementation with two's complement adder would deliver R1=A+B, R2=R1−P and a remaining portion of R2 if $R2 \geq 0$ and R1 if R2<0.

The term 'adding binary' may denote—in contrast to modular addition—a regular addition of at least two binary values. Throughout this document, a clear distinction should be made between the two types of addition operations: binary add vs modular add. E.g., the modular multiply R=(A*B) mod P is comparably harder to solve than the above-described modular add because $0 \leq A+B<P*P$. The modular correction is more complex than a conditional subtraction 1*P. For most prime curves, the modular correction is compute intensive and computationally intensive and mathematically tricky. This applies in particular if the operands A, B have values with a very high number of bits, e.g., larger than 255.

The term 'large integer value' may denote integer values with bit sizes of 256 to 521 bits, those up to 8k bits, and even more bits.

The term 'operand value' may denote input values for a mathematical operation like a modular addition, a binary addition, a binary multiplication, and a modular multiplication.

The term 'single combined modular correction term' may denote one single numeric value which is used as an operand of an add operation, wherein a sequence of binary additions and binary multiplications have built the second operand.

The term 'redundant number form' or 'redundant number representation' may denote a numeral system that uses more bits than needed to represent a single binary digit, so that most numbers can have several representations. A redundant number representation is unlike usual binary numeral systems, including two's complement, where each bit has a unique value depending on its position. Many of redundant binary representation (BR) properties differ from those of regular binary representation systems. Most importantly, a redundant number representation allows addition without using a typical carry. When compared to non-redundant representation, a redundant number representation can make bitwise logical operation slower, but arithmetic operations may be faster when a greater bit width is used. Usually, each digit has its own sign that is not necessarily the same as the sign of the number represented. When digits have signs, that redundant number representation is also a signed-digit representation.

The term 'reduced-radix form' or 'reduced radix representation' may denote the known number format in computer science allowing faster algorithmic operations of binary numbers. Two numbers X and Y are considered to be reduced radix complements of each other if: X+Y=10bn−1, where n is the number of digits in X and Y, and where b is the base of X and Y.

The term 'binary multiplication' may denote a simple multiplication of binary numbers. This should not be intermixed with a modular multiplication. Care should be taken to clearly differentiate between the two different operations. A binary multiply operation may simply be expressed as r=a×b, where a and b are binary values expressed in binary format or representation. In contrast, a modular multiplication is expressed as (a×b) mod c. As a reminder, modular arithmetic is a system of arithmetic for integers, where numbers "wrap around" when reaching a certain value, called the modulus c in the preceding sentence.

The term 'coarse-grained modular correction term' may denote a value—or a plurality thereof—used to correct a first approximation of a mathematical operation, e.g., a modular add operation. In a second correction step, fine-grained modular correction terms can be used to correct first correction steps even better.

The term 'Solinas reduction operation' may denote here a special operation used for generating coarse grained modular correction terms for a modular multiplication of very long integers as a key building block of, e.g., fully homomorphic encryption and elliptic curve cryptography. Basically, such an operation reduces the complexity of the related operation, thus, making hardware implementations more efficient. In mathematics, a Solinas prime, or generalized Mersenne prime, is a prime number that has the form $f(2^m)$, where f(x) is a low-degree polynomial with small integer coefficients. These primes may allow fast modular reduction algorithms. This class of numbers encompasses a few other categories of prime numbers, like Mersenne primes, which have the form $2^k-1$, or Crandall or pseudo-Mersenne primes, which have the form $2^k-c$ for small, odd c values.

The term 'Barrett reduction operation' may denote another operation in this context. A naive way of computing c=a mod n would be to use a fast approximate division by n followed by application of a correction term. Barrett reduction is an algorithm designed to optimize this operation assuming n is constant, and $a<n^2$, replacing divisions by multiplications.

The term 'elliptic curve operation' (ECC) may denote an approach to public-key cryptography based on the algebraic structure of elliptic curves over finite fields. ECC allows smaller keys compared to non-EC cryptography (e.g., based on plain Finite fields) to provide equivalent security. Typically, elliptic curves are applicable for key agreement, digital signatures, pseudo-random generators, blockchains and other tasks. Indirectly, elliptic curves can be used for encryption by combining the key agreement with a symmetric encryption scheme. In the context of this document, elliptic curves are mainly used as a mathematically hard problem to solve in absence of some secret information, which has many applications in cryptography.

The term 'reduction tree generator module' may denote a unit optimized for processing large input data sets. It is assumed that there is no order of processing elements in a data set (i.e., it shall be associative or commutative). The data set is partitioned into smaller chunks and parallel threads can be used to process the chunks. Then, a reduction tree may be used to summarize the results from each chunk into a final result.

The term 'sum/carry vector pair' may denote a number representation that is discussed in the context of FIG. 9.

In the following, a detailed description of the figures will be provided. All instructions in the figures are schematic. Firstly, a block diagram of an embodiment of the inventive computer-implemented method for a modular addition of a plurality of operands of first large integer values is described. Afterwards, further embodiments, as well as embodiments of the fast modular addition system for a fast modular addition of first large integer values will be described.

FIG. 1 shows a block diagram of an embodiment of the computer-implemented method 100 a modular addition of a plurality of operands of first large integer values. The operands can be positive or negative values. Hence, an explicit subtraction method is not required.

The method comprises receiving, 102, a plurality of first operand values, later to be denoted as Ti, where the operand values are very large integer values, e.g., >255 bit wide.

The method also comprises adding, using binary addition, 104, the plurality of operand values resulting in a sum value S, determining a single combined modular correction term D for the binary sum of all operand values based on leading bits of the sum value S and determining, 106, a single combined modular correction term D for the binary sum of all operand values based on leading bits of the sum value S.

In step 108, the method comprises performing a modular addition of S and D resulting in a modular sum of the plurality of the first operand values.

FIG. 2 shows a flowchart of an embodiment 200 for a modular multiply operation that uses the concept of the fast modular adder as a core unit. The elements of the flowchart steps for performing a modular multiplication comprise the following: performing, 202, a binary multiplication—i.e., M=A*B—of second large integer values A, B—e.g., 256 to 521 bit wide or even a much larger number of bits—which result in a binary product M. This can be—and actually is—represented by a plurality of adjacent words of a predefined number of bits, e.g. 128 bit words or other bit sizes.

Then, determining, 204, a plurality of coarse-grained modular correction terms Ti of the binary product, resulting in a plurality of adjacent words of a predefined bit size for each Ti. These can have the same number of bits as the adjacent words mentioned at the end of the previous paragraph. However, the number of bits of these adjacent words is typically lower. The determination of the coarse-grained modular correction terms Ti is typically based on the theory of Solinas, i.e., Solinas prime numbers, and are also denoted as generalized Mersenne prime, i.e., a prime number that has the form $f(2^m)$, where $f(x)$ is a low-degree polynomial with comparably small integer coefficients. These primes allow fast modular reduction algorithms and are often used in cryptography application.

As a follow-up step, the approach uses, 206, the plurality of terms Ti as the received plurality of operand values (compare description of FIG. 1). Thereby, a result of a fast modular multiply operation is produced.

It should also be mentioned that this depends on the exact implementation which bits are used. E.g., when P is q-bit wide, and Sum is q+k bits wide, then one can look at the k leading bits. When using a redundant number system, one usually looks at a few more bits, e.g., k+2 bits.

FIG. 3 shows a block diagram 300 of an embodiment of a modular multiplication with correction terms. A modular add operation R=(A+B) % P, wherein "%" is the modulus operator and P is a prime number, can be performed comparably easy because the binary sum is $0 \le A+B < 2*P$. In hardware, this can be realized by a two's complement adder:

$$R1 = A + B$$

$$R2 = R1 - P$$

$$R = R2 \text{ if } R2 \ge 0 \text{ or } R = R1 \text{ if } R2 < 0.$$

On the other side, the modular multiply operation R=(A*B) % P is a more difficult problem because $0 \le A*B < P*P$. Thus, the modular correction is not just a conditional subtraction of 1*P, and therefore, foremost prime curves of the modular correction is computationally intensive and mathematically tricky. This applies in particular if the operands A, B have values with a very high number of bits, e.g., larger than 255.

For generalized Mersenne Primes, the modular multiply operation R=(A*B) % P can be determined by A*B=bin (Cn . . . CO), wherein each Ci is a 32-bit word. Then, multiple correction terms Ti get formed out of the Ci's. The modular product gets obtained by modular adding the terms Ti such that R=(A*B) % P=T0⊕T1⊕T2⊕ . . . |Tk, wherein ⊕ is an add-mod-P operation.

A naïve hardware implementation for this is relatively easy to test as a loop of modular additions. However, a fast hardware implementation applies a coarse-grained and a fine-grained correction. This is shown in FIG. 2 for the modular multiply operation.

The two operands A, B 302 firstly undergo a binary product A*B 304 operation, resulting in the product M. Then, the coarse-grained correction terms T0, T1, T2, . . . Tk 306 are determined and are added by a binary adder 308 in parallel, resulting in the intermediate result I. The fine-grained correction terms 310 depend, of course, on the value of the intermediate result I and its number representation. In order to apply the fine-grained correction terms 310, a mod P adder 312 is used to determine the final result R.

The structure of FIG. 3 also applies to the Barrett reduction which can perform the modular reduction for any arbitrary prime. Let k be the bit width, and N=floor $(2^{(2k)}/P)$. The Barrett reduction for the product M=A*B then performs the steps:

$$Q = (M >> (k-1)) * N \qquad \qquad 1.$$

$$R1 = (Q >> (k-1)) * P \qquad \qquad 2.$$

$$R2 = M[k:0] - R1[k:0] \text{ (low order } k+1 \text{ bits)}, \qquad 3.$$

The Barrett reduction then corrects R2 by conditionally adding $2^{(k+1)}$ if R2 is negative or subtracts P or 2P to achieve the R=(A*B) % P. Here, the steps 1 and 2 determine the coarse-grained correction (206), and step 3 applies this to the product. The subsequent correction of R2 is the fine-grained correction such as in (310) and (312).

I.e., the core operation, which is repeatedly required, is a modular adder; this applies also to the case of a modular multiplication. Therefore, a successful implementation of a modular multiplier operation unit relies on a hardware implementation of a modular adder circuit as an underlying operational unit. This is shown in the following figures.

FIG. 4 shows a modular adder 400 for the concept of a fast modular multiplier for a plurality of terms Ti (402), e.g., the ones generated when performing the sequence of steps explained in FIG. 3. The input terms 402 T1, T2, . . . , Tn are fed to an n-way binary adder 404 resulting in the sum S. A result D of the determination unit 406 adapted for determining a single combined correction term D for the k additions/subtractions is fed together with the sum S to the modular adder 408 which accepts two variables as input, namely, S and D. The output of the 2-way modular adder 408 is then the result R 410 which is a modular sum of a plurality of operands for a modular add operation.

FIG. 5 shows implementation details of a modular multiplier unit 500 for a modular multiplication of integer terms A and B each having a large number of bits, as already described. The operands A and B are fed to a binary multiplier unit 502 and then require correction terms that are determined with determinator 504. The concept that is used is described further in FIG. 2. The output correction terms 402 T1, T2, . . . , Tn (compare FIG. 4) are then used as input for the modular n-way adder 400 (compare FIG. 4). The result R 506 is then a modular multiply operation over A and B.

FIG. 6 shows another implementation option for a modular adder 600 which details the n-way binary adder 404 of FIG. 4 in additional detail. Inside the n-way binary adder 404, a reduction tree unit 602 is operated which result is input to a binary adder 604. The output S of the n-way binary adder 404 is then fed to the 2-way binary adder 606.

At this point, the sum S, as well as the determinator 406 for the combined modular correction term D works as described in the context of FIG. 4.

The 2-way modular adder 408 (compare also to FIG. 4) operates internally with the 2-way binary adder 606 and a selection logic 608 which may use digital components like multiplexer and/or look-up tables. The binary adder 606 accepts as input the sum S of the binary 2-way adder 604 and the output D of the output of the determinator 406 for the combined modular correction term D. As a final result R 410, the modular sum for the operands T1, T2, Tn is generated.

FIG. 7 shows a block diagram of an alternative implementation 700 of the modular adder. As input, again the multiple operands T1, T2, Tn 402 are used and fed to the n-way binary adder 404, which can have, internally, a reduction tree unit 702 which outputs the result of the binary add operation as carry/sum vector pair 704. This implies that, as a data format, a redundant format, e.g., S0, S1, is used. One example is the reduced radix number format which is frequently used in crypto-libraries such as Open SSL X255-19 with prime number 521. Additionally, a full radix format can also be used as well as the lazy reduction in [0, 88P). The modular adder 408 can, in such an embodiment, comprise a binary adder 706 and respective selection logic 708 to deliver the modular sum R 410.

FIG. 9 gives an indication 900 of how the redundant format with carry/sum vector pairs 704 can work. In a scientific form, one would define the reduced-radix representation as:

Let P be an n-bit number and W be the processor's word size; chose $p \in \mathbb{R}$ such that $0 < P < W$ and define $l = \lceil N/P \rceil$; then, an element $a \in F_p$ is represented by a sequence of integer digits $A = (a_0, a_1, \ldots, a_{l-1})$ such that $a = \sum_{i=0}^{l-1} 2^{\lceil ip \rceil} a_i \bmod p$, and $0 \le a_i < 2^{\lceil (i+1)p \rceil - \lceil ip \rceil}$. FIG. 7 shows this in a more comprehendible form where reference numeral 902 relates to bits that can accumulate carries, i.e., vertically seen as carry vector, wherein all P values represent the sum vector.

FIG. 8 shows a block diagram of an alternative implementation of a modular adder 800 using a reduced number presentation. Input 402, the binary adder 404 and the reduction tree unit 702 are compatible with the corresponding elements of FIG. 7. This applies also to the output 806 of the binary adder 404, namely, the carry/sum vector pair.

However, in such a case the feedback loop through the selector (or determinator) for a determination of the combined correction term D is wired differently. Firstly, the sum vector S 812 is directly fed back to the modular adder 408 as additional input together with the combined correction term D 814 in order to generate the modular sum R 410. The vector S is also fed to the selector for a combined modular correction 808 delivering the term D 814, which is also fed to the modular adder 408. This can again be implemented using a binary adder 810 and a select logic 812. Various other implementation forms are possible.

Embodiments of the invention may be implemented together with virtually any type of computer, regardless of the platform being suitable for storing and/or executing program code. FIG. 10 shows, as an example, a computing system 1000 suitable for executing program code related to the proposed method.

The computing system 1000 is only one example of a suitable computer system, and is not intended to suggest any limitation as to the scope of use or functionality of embodiments of the invention described herein, regardless, whether the computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couple various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the invention.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the invention, as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of the computer system/server 1000 via bus 1006. It should be understood that, although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

Additionally, the fast modular addition system for a fast modular addition of first large integer values or any of the embodiments 500, 600, 700 or 800 (compare FIGS. 4, 5, 6, 7, 8) may be attached to the bus system 1006. Also, the other adder and multiplier units discussed above could be integrated into a regular computer design. Furthermore, the implementation can also comprise to integrate the complete modular adder and/or modular multiplier into the hardware of the processor chip or in a form of a co-processor using, e.g., an FPGA (field programmable gate array) or in direct CMOS or bipolar form.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The inventive concept may be summarized by the following clauses:

1. A computer-implemented method comprising: receiving a plurality of first operand values, wherein said first operand values are integer values; adding, using binary addition, said plurality of first operand values resulting in a sum value S; determining a single combined modular correction term D for a binary sum of all operand values based on leading bits of said sum value S; and performing a modular addition of S and D resulting in a modular sum of said plurality of said first operand values.

2. The method according to clause 1, wherein said sum value S is represented in a redundant number form.

3. The method according to clause 2, wherein said redundant number form is a reduced-radix form.

4. The method according to any of the preceding clauses, further comprising: determining a correction value $-k*P$, wherein k is a value representing said leading bits of said sum value S.

5. The method according to clause 4, wherein said correction value is determined using a lookup table.

6. The method according to any of the preceding clauses, further comprising performing a binary multiplication of second integer values A and B, which results in a binary product M, which is represented by a plurality of adjacent words of a predefined number of bits; determining a plurality of coarse-grained modular correction terms Ti of said binary product M, resulting in a plurality of adjacent words of a predefined bit size for each Ti; and using said plurality of terms Ti as said received plurality of first operand values, producing a result of a fast modular multiply operation.

7. The method according to clause 6, wherein said second integer values are represented in a redundant number form.

8. The method according to clause 7, wherein said redundant number form is a reduced-radix form.

9. The method according to clause 6, further comprising, responsive to receiving said second integer values in a non-redundant format, transforming said received second integer values into a redundant number form.

10. The method according to any of the preceding clauses, wherein said plurality of first operand values originate from a selection from the group consisting of: a Solinas reduction operation and a Barrett reduction operation.

11. The method according to any of the preceding clauses, wherein said A and B is each an integer value having a number of bits between 255 and 521.

12. The method according to any of the preceding clauses, wherein said received integer values are operand values for elliptic curve operations.

13. A system (400) comprising: a receiving unit for a plurality of first operand values, wherein said first operand values are integer values; a binary adder unit (404) adapted for adding, using binary addition, said plurality of first operand values resulting in a sum value S; a determination unit (406) adapted for determining a single combined modular correction term D for a binary sum of all operand values based on said sum value S; and a modular adder unit (408) adapted for a modular addition of S and D resulting in a modular sum of said plurality of said first operand values.

14. The system according to clause 13, wherein said determination unit (406) is adapted for determining said single combined modular correction term D for said binary sum of all operand values based on leading bits said sum value S.

15. The system according to clause 13 or 14, wherein said binary adder (404) unit comprises a reduction tree generator module (602) adapted for receiving said plurality of integer values from said receiving unit, and an internal binary adder unit (604) adapted for receiving output values of said reduction tree generator module.

16. The system according to any of the clauses 13 to 15, wherein said modular adder (408) comprises a binary adder (706) adapted for adding, using binary addition, said sum value S and D; and a select logic (708) adapted for determining said modular sum of said plurality of said first operand values.

17. The system according to any of the clauses 13 to 16, wherein said binary adder (404) unit is a reduction tree generator module (702) adapted for: receiving said plurality of large integer values from said receiving unit, and which is adapted for generating an output as a sum/carry vector pair (704), wherein said binary sum comprises an identical bit-width as said received large integer values, and wherein said carry comprises a predefined number carry bits.

18. The system according to clause 17, wherein said modular adder (408) comprises: a binary adder (706) for binary adding said sum/carry vector pair (704) and said value D, wherein said value D is determined based on said sum/carry vector pair (704); and a select logic (708) adapted for determining said modular sum of said plurality of said first operand values.

19. The system according to any of the clauses 13 to 18, further comprising a receiving unit for two second operand values (A, B), wherein said operand values are integer values; a binary multiplier (502) adapted for receiving said second two operand values from said receiving unit; and a correction unit (504) adapted for a determination of correction terms of said binary multiplier (502) resulting in said plurality of first large integer values (T1, . . . Tn).

20. A computer program product comprising: a computer readable storage medium having program instructions embodied therewith, said program instructions being executable by one or more computing systems or controllers to cause said one or more computing systems to: receive a plurality of first operand values, wherein said first operand values are integer values, add, using binary addition, said plurality of first operand values resulting in a sum value S; determine a single combined modular correction term D for a binary sum of all operand values based on leading bits of said sum value S, and perform a modular addition of S and D resulting in a modular sum of said plurality of said first operand values.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
performing, by one or more processors, elliptic curve cryptography (ECC) operations for an approach to public-key cryptography based on algebraic structure of elliptic curves over finite fields by combining a key agreement with a symmetric encryption scheme, the ECC operations comprising:
receiving, by one or more processors, a plurality of first operand values, wherein:
the plurality of first operand values are integer values; and
the plurality of first operand values originate from a Solinas reduction operation;
adding, by a hardware n-way binary adder comprising a carry sum adder and a binary adder, using binary addition, the plurality of first operand values, resulting in a sum value, wherein:
the carry sum adder receives the plurality of first operand values and outputs, to the binary adder, a carry/sum vector pair represented in a redundant number form; and
the redundant number form is a reduced-radix form;
determining, by one or more processors, a single combined modular correction term for a binary sum of all operand values based on: (i) leading bits of the sum value and (ii) by using a lookup table that gives a modulus number represented by the leading bits of the sum value; and
performing, by a hardware modular adder comprising a second hardware binary adder and a multiplexer, a modular addition of the sum value and the single combined modular correction term, resulting in a modular sum of the plurality of first operand values.

2. The computer-implemented method of claim 1, further comprising:
performing, by one or more processors, a binary multiplication of second integer values, resulting in a binary product, wherein the binary product is represented by a plurality of adjacent words of a predefined number of bits; and
using, by one or more processors, a plurality of coarse-grained modular correction terms as the plurality of first operand values, producing a result of a modular multiply operation.

3. The computer-implemented method of claim 2, wherein the second integer values are represented in a redundant number form.

4. The computer-implemented method of claim 3, wherein the redundant number form of the second integer values is a reduced-radix form.

5. The computer-implemented method of claim 2, wherein the second integer values each comprise an integer value having a number of bits between 255 bits and 521 bits.

6. The computer-implemented method of claim 1, wherein the plurality of first operand values are operand values for elliptic curve operations.

7. A computer system comprising:

a processor set;

one or more computer-readable storage media; and program instructions stored on the one or more computer-readable storage media to cause the processor set to perform operations comprising:

performing elliptic curve cryptography (ECC) operations for an approach to public-key cryptography based on algebraic structure of elliptic curves over finite fields by combining a key agreement with a symmetric encryption scheme, the ECC operations comprising:

receiving a plurality of first operand values, wherein:

the plurality of first operand values are integer values; and the plurality of first operand values originate from a Solinas reduction operation;

adding, by a hardware n-way binary adder comprising a carry sum adder and a binary adder, using binary addition, the plurality of first operand values, resulting in a sum value, wherein:

the carry sum adder receives the plurality of first operand values and outputs, to the binary adder, a carry/sum vector pair represented in a redundant number form; and the redundant number form is a reduced-radix form;

determining a single combined modular correction term for a binary sum of all operand values based on: (i) leading bits of the sum value and (ii) by using a lookup table that gives a modulus number represented by the leading bits of the sum value; and performing, by a hardware modular adder comprising a second hardware binary adder and a multiplexer, a modular addition of the sum value and the single combined modular correction term, resulting in a modular sum of the plurality of first operand values.

8. A computer program product comprising:

one or more computer-readable storage media; and program instructions stored on the one or more computer-readable storage media to perform operations comprising:

performing elliptic curve cryptography (ECC) operations for an approach to public-key cryptography based on algebraic structure of elliptic curves over finite fields by combining a key agreement with a symmetric encryption scheme, the ECC operations comprising:

receiving a plurality of first operand values, wherein:

the plurality of first operand values are integer values; and the plurality of first operand values originate from a Solinas reduction operation;

adding, by a hardware n-way binary adder comprising a carry sum adder and a binary adder, using binary addition, the plurality of first operand values, resulting in a sum value, wherein:

the carry sum adder receives the plurality of first operand values and outputs, to the binary adder, a carry/sum vector pair represented in a redundant number form; and the redundant number form is a reduced-radix form;

determining a single combined modular correction term for a binary sum of all operand values based on: (i) leading bits of the sum value and (ii) by using a lookup table that gives a modulus number represented by the leading bits of the sum value; and performing, by a hardware modular adder comprising a second hardware binary adder and a multiplexer, a modular addition of the sum value and the single combined modular correction term, resulting in a modular sum of the plurality of first operand values.

* * * * *